US006551395B2

(12) United States Patent
Isogawa

(10) Patent No.: US 6,551,395 B2
(45) Date of Patent: Apr. 22, 2003

(54) GOLF BALL PRINTING INK, GOLF BALL PRINTING METHOD UTILIZING THE INK, AND GOLF BALL PRINTED WITH THE INK

(75) Inventor: Kazuhiko Isogawa, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 42 days.

(21) Appl. No.: 09/813,151

(22) Filed: Mar. 21, 2001

(65) Prior Publication Data
US 2002/0037777 A1 Mar. 28, 2002

(30) Foreign Application Priority Data

Mar. 21, 2000 (JP) ......................... 2000-078703

(51) Int. Cl.$^7$ ........................... A63B 37/00; C09D 11/10
(52) U.S. Cl. ................. 106/31.75; 106/31.13; 101/491; 525/528; 528/73; 473/351; 473/365; 473/385
(58) Field of Search .................. 101/491; 106/31.13, 106/31.75; 473/351, 365, 385; 525/528; 528/73

(56) References Cited

U.S. PATENT DOCUMENTS 3,874,921 A * 4/1975 Todd
5,160,536 A 11/1992 Harris et al.
5,744,519 A * 4/1998 Heraud
5,770,325 A 6/1998 Keller et al.
5,878,670 A 3/1999 Yamaguchi
5,885,173 A * 3/1999 Keller
6,057,043 A 5/2000 Kametani et al.
6,217,985 B1 * 4/2001 Hirukawa
2001/0003716 A1 6/2001 Kametani et al.

FOREIGN PATENT DOCUMENTS

| JP | 06-009915 | * | 1/1994 |
| JP | 9-122271 | | 5/1997 |
| JP | 10-211302 | | 8/1998 |
| JP | 11-78253 | | 3/1999 |
| JP | 11-114093 | | 4/1999 |
| JP | 11-139095 | | 5/1999 |
| JP | 11-319147 | | 11/1999 |

* cited by examiner

Primary Examiner—David J. Buttner
(74) Attorney, Agent, or Firm—Birch, Stewart, Kolasch & Birch, LLP

(57) ABSTRACT

This application discloses a golf ball printing ink enabling printing a clear mark which is free of any void or pinhole and has superior impact resistance and scuffing resistance without the need for a primer coat, a golf ball printing method utilizing the ink, and a golf ball bearing thereon a mark printed with the ink. The ink includes an epoxy resin and a coloring agent, and preferably further includes an isocyanate compound as a curing agent.

13 Claims, No Drawings

GOLF BALL PRINTING INK, GOLF BALL PRINTING METHOD UTILIZING THE INK, AND GOLF BALL PRINTED WITH THE INK

BACKGROUND OF THE INVENTION

1. Field of the Invention

The present invention relates to golf ball printing inks suitable for pad printing technique and, more particularly, to an ink which can produce a mark having a good appearance and a superior durability without the need for a primer coat on the surface of a golf ball body prior to printing. The invention also relates to a method of printing a mark using the particular ink and to a golf ball having a durable mark printed thereon with the ink.

2. Description of the Related Art

Golf balls are generally stamped or printed with a trademark or other identifying indicia. A conventional method for printing a mark or indicia on a golf ball surface comprised the steps of; applying a white paint to the surface of a golf ball body; printing a mark on the white painted surface; and then applying a clear coat over the white painted surface and the printed mark to improve the appearance of the ball.

Recently, elimination or simplification of the coating step prior to the printing step has been required. In order to meet the requirement, an ink is suggested, the use of which enables the direct printing of a mark on the cover made from a material containing a white pigment. For example, U.S. Pat. No. 5,160,536 discloses an ink containing nitrocellulose. This ink allows direct printing on the surface of a cover made from an ionomer resin without the need for a primer coat while avoiding unintended transfer of the ink from one golf ball to another due to contact with adjacent golf balls before a clear coat is applied on top of the ink.

This ink, however, does not show enough adherence to the ball body surface sufficient to impart satisfactory durability to a mark printed with the ink. When the clear coating film formed over the printed mark with the ink peels off due to repeated shots or particularly a bunker shot with a golf club, the printed mark peels off together with the clear coating film.

Insufficient adherence of an ink to the ball body surface also causes another problem associated with a mark printed on a golf ball body with an ink using the pad printing technique. In the pad printing process, insufficient adherence of an ink to the surface of the golf ball body may produce unsatisfactory ink transfer from the pad to the ball body with the result that the mark has a poor appearance whereby a void or pinhole due to an ink portion not transferred to the golf ball body.

It is, therefore, an object of the present invention to provide a golf ball printing ink which allows direct printing on a cover made from an monomer resin or the like or on the surface of a golf ball body made from a vulcanized rubber without the need for a primer coat prior to the printing step. The present invention enables the printing of a defined mark free of any void or pinhole thereon, and ensures a printed mark having superior impact resistance and scuffing resistance which can be retained on the golf ball even when a clear coat as the outermost layer of the golf ball is peeled off due to repeated shots, bunker shots or the like with a golf club. Another object of the present invention is to provide a golf ball printing method using the inventive ink and a golf ball having a mark printed with the ink.

SUMMARY OF THE INVENTION

According to one aspect of the present invention, there is provided a golf ball printing ink for printing a mark on a surface of a golf ball body, comprising an epoxy resin and a coloring agent. The golf ball printing ink may further include an isocyanate compound as a curing agent.

According to another aspect of the present invention, there is provided a golf ball printing method comprising the steps of: roughening a surface of a golf ball body; and printing a mark on the roughened surface of the golf ball body using the pad printing technique, with the use of an ink including an epoxy resin and a coloring agent.

According to yet another aspect of the present invention, there is provided a golf ball comprising a golf ball body and a mark printed thereon with the inventive ink.

It should be noted that the term "mark" as used in the present invention is meant to include any character and any image as well as any identifying indicia such as a trademark or logo.

These and other objects, features and attendant advantages of the present invention will be more fully appreciated from the reading of the following detailed description.

DETAILED DESCRIPTION OF THE PREFERRED EMBODIMENTS

An ink according to the present invention is used for printing a mark such as a pattern or a character on the outer surface of a cover made from resin such as ionomer resin or a golf ball body made from a vulcanized rubber. The ink comprises an epoxy resin and a coloring agent, and preferably further comprises a curing agent.

The epoxy resin is contained as a basic resin in the ink and has two or more epoxy groups in the polymer chain thereof, and is capable of crosslinking through the reaction with the curing agent.

The epoxy resin is cured to form a chemical network structure through a crosslinking reaction with a curing agent in the case of a thermoset epoxy resin or with a free radical produced from a photosensitizer by irradiation with ultraviolet rays in the case of a photosensitized epoxy resin. Since such crosslinking reactions proceed rapidly by heating in the presence of the curing agent or by irradiation with ultraviolet rays in the presence of the photosensitizer, the printed mark made from the ink containing the cured epoxy resin is prevented from being transferred from one golf ball to another during conveyance to the succeeding step of an application of a clear coat. Further, the crosslinked epoxy resin can provide the mark with a superior scuffing resistance.

Examples of such epoxy resins used in the present invention include thermoset epoxy resins such as a bisphenol A type epoxy resin obtained from bisphenol A and epichlorohydrin, a bisphenol F type epoxy resin, a novolactype epoxy resin, an alicyclic-type epoxy resin, a glycidyl ester-type epoxy resin, and glycidylamine-type epoxy resin; and photosensitized epoxy resins incorporated with an acryloyl group or a methacryloyl group to enhance their photosensitivity.

According to the present invention, a preferable epoxy resin has a hydroxyl value of not less than 50, more preferably not less than 100, further preferably not less than 150, particularly not less than 180. The upper limit of the hydroxyl value of the epoxy resin is preferably not more than 300, more preferably not more than 250, further preferably not more than 195. The term "hydroxyl value" as used herein is a value serving as an indication of the amount of hydroxyl groups contained in an epoxy resin. Specifically, the hydroxyl value means the amount in "mg" of potassium hydroxide required to neutralize an acetyl group in acetic acid resulting from saponification of an acetylated compound. The epoxy resin having the hydroxyl value of less than 50 cannot be crosslinked to the desired extent through the reaction with a curing agent, thus resulting in a mark having a lowered durability. When the hydroxyl value is more than 300, a large quantity of the curing agent is required for curing the epoxy resin and resulting in lowering workability due to too high reactivity.

Hydroxyl groups in the epoxy resin can also contribute to a superior affinity of the ink for the surface of the golf ball body, particularly for an ionomer resin cover and hence allow direct printing of the mark on a surface of the ball body without a primer coat. Further, since the ether linkage in the backbone chain of the epoxy resin permits a larger freedom of rotation of the chain, a mark containing the cured epoxy resin is imparted with pliability and flexibility. This means that a mark made from the cured ink is capable of following up any deformation of the ball caused upon a hit and, hence, crazing or peeling of the mark due to repeated hits against the ball can be inhibited.

The curing agent to be used for curing the thermoset epoxy resin may be any basic or acidic compound which has a plurality of active hydrogen atoms to react the epoxy group or which catalyzes ring opening of the epoxide. Examples of such curing agents include amines, acid anhydrides, isocyanate compounds, resol-type phenolic resins, melamine resins, and urea resins. Among them, isocyanate compounds are preferably employed.

Examples of specific amines for use as the curing agent include aliphatic amines such as ethylenediamine, 1,3-diaminopropane, 1,4-diaminopropane, and hexamethylenediamine; aliphatic polyamines such as diethylenetriamine, imino-bis-propylamine, and triethylenetetramine; and aromatic amines such as methaphenylenediamine, diaminodiphenylmethane, and diaminodiethyldiphenylmethane.

Examples of specific acid anhydrides for use as the curing agent include aliphatic acid anhydrides such as dodecenylsuccinic anhydride, polyadipic anhydride, polyazelaic anhydride, and polysebacic anhydride; alicyclic acid anhydrides such as methyltetrahydrophthalic anhydride, methylhexahydrophthalic anhydride, hexahydrophthalic anhydride, and tetrahydrophthalic anhydride; aromatic acid anhydrides such as phthalic anhydride, trimellitic anhydride, and pyromellitic anhydride; and halogen-based acid anhydrides such as HET anhydride.

The isocyanate compound preferably has two or more isocyanate groups. Examples of such isocyanate compounds include aliphatic, alicyclic, aromatic or aromatic aliphatic diisocyanate compounds such as hexamethylene diisocyanate, xylylene diisocyanate, hydrogenated xylylene diisocyanate, isophorone diisocyanate, tetramethylxylylene diisocyanate, hydrogenated diphenylmethane diisocyanate, and tolylene diisocyanate. Among them, hexamethylene diisocyanate is preferred in terms of the durability of a resulting mark made from the cured ink and the adherence of the cured ink to the clear coat put on the mark.

Onium salts of Brønsted acid may be used as the photosensitizer. Examples of such onium salts include an aromatic diazonium salt which produces Lewis acid corresponding to the Brønsted acid by decomposition thereof, and an aromatic sulfonium salt which produces Brønsted acid by decomposition thereof. The onium salt can take place ring opening of the epoxide.

The ink according to the present invention may contain any other resin with the epoxy resin as long as the resin does not deteriorate the desired characeristics of the printed mark. Examples of such other resins include polyester resins, acrylic resins, vinyl resins, urethane resins, phenolic resins, urea resins, melamine resins, and polyamide resins.

The content of the epoxy resin in the ink is preferably not less than 10% by mass, more preferably not less than 15% by mass. The upper limit of the content of the epoxy resin in the ink is preferably 50% by mass, more preferably 45% by mass. When the epoxy resin content is less than 10% by mass, the adherence between the ink and the ball surface is liable to decrease, whereas when the epoxy resin content is more than 50% by mass, the content of the coloring agent becomes relatively decreased thereby lowering the chromaticity of a resulting mark. To compensate for such a lowered chromaticity, the ink needs to be applied thick, which will cause the adherence of the clear coat formed as the outermost layer to lower.

The content of the curing agent in the ink is preferably not less than 1% by mass, more preferably not less than 3% by mass. The upper limit of the content of the curing agent is preferably 30% by mass, more preferably 25% by mass. When the curing agent content is less than 1% by mass, the curing time is prolonged and, hence, the producing time of a golf ball increases, whereas when the curing agent content is more than 30% by mass, rapid curing of the ink shortens its pot life and, hence, the workability is prone to lower.

Any conventional coloring agent may be used in the present invention without any particular limitation. Examples of such coloring agents include: black pigments such as carbon blacks including acetylene black, lamp black and aniline black; yellow pigments such as chrome yellow, zinc yellow, cadmium yellow, yellow oxide, mineral fast yellow, nickel-titanium yellow, Naples yellow, naphthol yellow S, Hansa yellow G, Hansa yellow 10G, benzidine yellow G, benzidine yellow GR, quinoline yellow lake, permanent yellow NCG and tartrazine lake; orange pigments such as chrome orange, molybdenum orange, permanent orange GTR, pyrazolone orange, vulcan orange, Indanthrene Brilliant Orange RK, benzidine orange G and Indanthrene Brilliant Orange GK; red pigments such as red oxide, cadmium red, red lead oxide, mercury sulfide cadmium, permanent red 4R, lithol red, pyrazolone red, Watching red calcium salt, lake red D, brilliant carmine 6B, eosin lake, rhodamine lake B, alizarin lake and brilliant carmine 3B; violet pigments such as manganese violet, fast violet B and methyl violet lake; blue pigments such as Prussian blue, cobalt blue, alkali blue lake, Victoria blue lake, phthalocyanine blue, metal-free phthalocyanine blue, partially chlorinated phthalocyanine blue, fast sky blue and Indanthrene blue BC; green pigments such as chrome green, chrome oxide, pigment green B, malachite green lake and final yellow green G; and white pigments such as silica, zinc white, titanium oxide, antimony white, zinc sulfide baryte powder, barium carbonate, clay, talc and alumina white.

Although the content of the coloring agent in the ink may be determined depending on factors such as the thickness of a mark to be printed, the content of the coloring agent in the ink is preferably not less than 1% by mass, more preferably not less than 3% by mass. The upper limit of the coloring agent content in the ink is preferably 30% by mass, more preferably 25% by mass. When the coloring agent content is less than 1% by mass, a resulting mark exhibits a lowered chromaticity, whereas when the coloring agent content is more than 30% by mass, the adherence of the ink to the ball body lowers.

The ink according to the present invention preferably contains a solvent in addition to the epoxy resin, coloring agent and curing agent (or photosensitizer), and may further contain additives such as an antioxidant and an ultraviolet absorber.

Any solvent having compatibility with the epoxy resin is preferably used. Examples of such solvents include aromatic hydrocarbons such as toluene and xylene, ester solvents such as ethyl acetate and butyl acetate, ether solvents such as dimethyl ether and diethyl ether, ketone solvents such as methyl ethyl ketone, and alcohol solvents such as methanol, ethanol and isopropyl alcohol. The content of such a solvent in the ink is preferably 20% by mass, more preferably 30% by mass. The upper limit of the content of the solvent in the ink is preferably 70% by mass, more preferably 60% by mass. If the content of the solvent is less than 20% by mass, the ink is hard to transfer from the pad to the golf ball surface in pad printing process, thus resulting in a printed mark having a poor appearance with pinholes or the like. On the other hand, if the content of the solvent is more than 70% by mass, it will take a longer time for the ink in the shape of a mark to be dried after printing the mark thereby increasing the producing time of the golf ball, and the mark may become blurred or have a void or pinhole due to relatively decreased amounts of the resin and coloring agent.

Accordingly, a printing ink in a preferable embodiment of the present invention comprises the epoxy resin in an amount of 10 to 50% by mass, the coloring agent in an amount of 1 to 30% by mass, a curing agent in an amount of 1 to 30% by mass, and a solvent in an amount of 20 to 70% by mass. These amount represent amounts based on the total mass of the ink.

The inventive ink allows direct printing of a mark on the surface of a golf ball body without the need for a primer coat prior to printing. Specifically, the ink enables direct printing on the surface of a cover made from a thermoplastic resin containing an ionomer in case of multi-piece golf ball as well as on the surface of a golf ball body made from a vulcanized rubber in case of a one-piece golf ball. The ink is particularly suitable for direct printing a mark on the surface of a cover made from an ionomer resin. Conceivably, this is because the epoxy resin as a major component of the ink has a high affinity with an ionomer and, hence, a resulting mark has a high adherence to the cover. However, the ink of the invention may be used in a conventional printing process such as to print a mark after applying a primer coat to a ball body.

A printing method of the present invention will be described below.

The mark printing method comprises the steps of: roughening a surface of a golf ball body; and printing a mark on the roughened surface of the golf ball body using pad printing technique with use of the inventive ink.

The golf ball body to be printed may be either a multi-piece golf ball body comprising a rubber core or a thread-wound core, and a cover made from a thermoplastic resin containing an ionomer as a major component, or a one-piece golf ball body made from a vulcanized rubber.

Examples of the thermoplastic resin as a cover material include ionomer resins, thermoplastic polyurethane elastomers, thermoplastic polyamide elastomers, and thermoplastic polyester elastomers; and mixtures thereof.

The vulcanized rubber used for a one-piece golf ball body is obtainable by vulcanizing a rubber composition comprising a diene rubber as a basic rubber, an organic peroxide as a crosslinking agent, unsaturated carboxylic acid or a metal salt thereof as a co-crosslinking agent, and other appropriate additives including a specific gravity adjuster, antioxidant, plasticizer, dispersant, ultraviolet absorber, coloring agent and a peptizer, as required. The basic rubber may be any natural or synthetic rubber so long as it is a diene rubber. Examples of such synthetic rubbers include ethylene-propylene-diene terpolymer (EPDM), butadiene rubber (BR), isoprene rubber (IR), styrene-butadiene rubber (SBR) and acrylonitrile-butadiene rubber (NBR). These may be used either alone or as a mixture of two or more of them.

The step of roughening the ball body surface is usually conducted by a sandblasting treatment, a barreling treatment or a like treatment. The roughening of the ball body surface advantageously enhances the adhesion between the ball body and the ink as well as the adhesion between the ball body and a clear coat formed over the ball body.

The subsequent printing step is to print a mark on the roughened surface by pad printing technique with use of the ink according to the present invention. The pad printing technique typically comprises the steps of: filling an ink into a recess in the shape of a mark; pressing a pad against the recess to transfer the ink forming the shape of the mark to the pad; and pressing the pad against the surface of the ball body to transfer the ink forming the shape of the mark to the ball body. Such a pad printing technique is suitable for printing a mark on a golf ball because it enables printing on a ball surface having a multiplicity of indentations such as dimples. The ink of the invention has a superior transferability and hence is suited for the pad printing process by which the ink forming a mark is transferred to the ball body through the pad.

After printing, the ink forming the mark thus printed directly on the ball body surface is dried and allowed to set. According to the present invention, drying at a temperature in the range of 30 to 70° C. is preferred. The time of drying is preferably between 1 hour and 24 hours. Drying process may be conducted by merely allowing the ink to stand or blowing a hot air having a temperature of 30 to 70° C. against the mark.

After drying, the entire ball surface including the mark is preferably coated with a clear coat. Such a clear coat is effective in protecting the mark as well as in improving the appearance of the ball. The clear coat may be single-layered or double-layered with an under coat and a top coat.

A conventional clear coat may be used. Preferably, a two-pack type polyurethane coating material comprising a chief material containing a polyol having a plurality of OH groups and a curing agent containing an isocyanate having a plurality of NCO groups is used. Examples of the polyols include polyester polyol, polyether polyol, acrylic polyol, and epoxy polyol. Examples of the isocyanates include tolylene diisocyanate, diphenylmethane diisocyanate, xylylene diisocyanate, and hexamethylene diisocyanate.

A golf ball according to the present invention comprises a ball body having a surface bearing a mark formed of the foregoing ink of the invention.

Any sort of ball body can be used without particular limitation. Above-mentioned ball bodies for the inventive printing method, namely a multi-piece golf ball body having a cover made from a thermoplastic resin or a one-piece golf ball body made from a vulcanized rubber, may be used.

The mark may be printed on the ball body surface either directly or through a primer coat layer. In printing the mark directly on the ball body surface, the ball body surface may be roughened or not.

The mark has superior scuffing resistance and impact resistance because the dried ink in the shape of the mark comprises the cured epoxy resin having a chemical network structure.

A pad printing technique is preferably employed for the printed mark of the inventive golf ball because a clear mark free of any pinhole is easily obtained thereby, but not limited to the pad printing technique.

The outermost layer of the golf ball according to the present invention is preferably composed of a clear coat. Stated otherwise, it is preferred that the entire ball body surface including the mark coated with a clear coat. The clear coat imparts an improved appearance to the golf ball while effectively protecting the mark. The clear coating layer is preferably made from the polyurethane coat mentioned above.

EXAMPLES

The present invention will be specifically described by way of examples thereof. It is to be noted that these examples are not limitative of the invention.

Evaluation Method

1. Appearance of Mark

A mark was printed on the surface of a ball by pad printing technique using an ink. The printed mark was visually observed to check the presence or absence of any pinhole.

The presence of a pinhole was indicated by a sign "○", and the absence of any pinhole was indicated by a sign "X"

2. Impact Resistance

Using a swing robot manufactured by True Temper Co., a ball was hit 200 times repeatedly with a #1 wood club at a head speed of 45 m/sec. The mark of the ball was visually observed to check the degree of peeling, and evaluated according to the following criteria:

⊚: mark not peeled

○: mark having a peeled area of less than 1 $mm^2$

Δ: mark having a peeled area of not less than 1 $mm^2$ and less than 2 $mm^2$

X: mark having a peeled area of 2 $mm^2$ or more

3. Scuffing Resistance

Using the above robot, a bunker shot was performed 50 times with a sand wedge. Thereafter, the mark thus subjected to bunker shots was visually observed to check the degree of chip-off or scuff due to abrasion of the mark, and evaluated according to the following criteria:

⊚: chip-off or scuff due to abrasion not found

○: chip-off or scuff of less than 1 $mm^2$ found

Δ: chip-off or scuff of not less than 1 $mm^2$ and less than 2 $mm^2$ found

X: chip-off or scuff of 2 $mm^2$ or more found

Preparation of Ink

EXAMPLE

A golf ball printing ink as an example of the present invention was prepared by mixing 21 parts (parts by mass, hereinafter the same) of an ink (PAD-EPH, available from NAVITAS CO.) containing an epoxy resin (hydroxyl value: 190), 9 parts of phthalocyanine blue as a coloring agent, 7 parts of hexamethylene diisocyanate as a curing agent, 49 parts of a mixed solvent comprising cyclohexanone, an aromatic hydrocarbon and methoxymethylbutyl acetate, and 14 parts of another additive (delustrant).

COMPARATIVE EXAMPLE

A golf ball printing ink as a comparative example was prepared in the same manner as in the above example except the use of an ink (PAD-1 INK) containing a nitrocellulose resin and polyester resin instead of the ink (PAD-EPH) containing the epoxy resin.

Manufacture of Golf Ball

Manufacture of Golf Balls Nos. 1 and 3

Golf balls Nos. 1 and 3 were manufactured by the following process: sandblasting the surface of a two-piece golf ball body having a cover made from a material containing an ionomer as a major component; printing a mark on the golf ball body by pad printing technique with use of the ink prepared according to the example or the comparative example; and drying the printed mark at 23° C. for 60 min and then applying a clear paint over the golf ball body and the printed mark to form a clear coat thereon. A polyurethane paint was used as the clear coating material.

Manufacture of Golf Balls Nos. 2 and 4

Golf balls Nos. 2 and 4 were manufactured in the same manner as in the manufacture of golf balls No. 1 (using the ink according to the example) and No. 3 (using the ink according to the comparative example) except that the surface of the golf ball body was coated with polyurethane enamel coating material as a primer coat and a mark was printed on the primer coating layer.

The mark printed on each of the golf balls thus manufactured was evaluated for its impact resistance, scuffing resistance and appearance. The results of the evaluation together with the formulation of each ink is shown in Table 1.

TABLE 1

| Golf ball No. | 1 | 2 | 3 | 4 |
|---|---|---|---|---|
| Primer Coat | Not provided | Provided | Not provided | Provided |
| Ink Formulation (Part) | | | | |
| Epoxy resin | 21 | 21 | — | — |
| Nitrocellulose Resin + Polyester Resin | — | — | 21 | 21 |
| Coloring Agent | 9 | 9 | 9 | 9 |
| Curing Agent | 7 | 7 | 7 | 7 |
| Additive | 14 | 14 | 14 | 14 |
| Solvent | 49 | 49 | 49 | 49 |
| Evaluation | | | | |
| Impact Resistance | ⊚ | ⊚ | Δ | Δ |
| Scuffing Resistance | ⊚ | ⊚ | X | X |
| Mark Appearance | ○ | ○ | X | ○ |

As seen from Table 1, the marks printed with use of the ink according to the example exhibited superior impact resistance and scuffing resistance (see Nos.1 and 2) to the marks printed with use of the ink according to the comparative example (see Nos.3 and 4).

As for the mark appearance, the use of the ink according to the example enabled printing of a clear mark free of any pinhole irrespective of whether or not the primer coat was provided, whereas the use of the ink according to the comparative example did not enable printing of a clear mark free of any pinhole unless the primer coat was provided.

As has been described above, the golf ball printing ink according to the present invention has a superior durability in terms of impact resistance and scuffing resistance as well as an excellent transferability and hence enables printing of a clear mark free of any pinhole even by the pad printing technique such as to print a mark through a pad. Besides, the ink exhibits a high affinity with a ball body surface, particularly with a resin cover containing an ionomer and, therefore, enables printing of such a clear mark free of any pinhole or the like without the need for a primer coat.

Thus, with the golf ball printing ink of the present invention, it is possible to meet the requirement for elimination of primer coating step and manufacture a golf ball bearing a durable mark printed thereon.

This application is based on patent application No. 2000-78703 filed in Japan, the contents of which are hereby incorporated by references.

While only certain presently preferred embodiments of the present invention have been described in detail, as will be apparent for those skilled in the art, certain changes and modifications can be made in embodiment without departing from the scope of the present invention as defined by the following claims.

What is claimed is:

1. A golf ball comprising a golf ball body, and a mark printed on the golf ball body with an ink, wherein the ink includes an epoxy resin, a coloring agent, and an isocyanate compound as a curing agent.

2. The golf ball according to claim 1, wherein the epoxy resin has hydroxyl groups.

3. The golf ball according to claim 1, wherein the epoxy resin has a hydroxyl value at least of 50 (mg KOH/g).

4. The golf ball according to claim 1, wherein the isocyanate compound is at least one member selected from the group consisting of hexamethylene diisocyanate, xylylene diisocyanate, hydrogenated xylylene diisocyanate, isphorone diisocyanate, tetramethylxylylene diisocyanate, hydrogenated diphenylmethane diisocyanate, and tolylene diisocyanate.

5. The golf ball according to claim 1, wherein the ink further contains a solvent.

6. The golf ball according to claim 5, wherein:

the epoxy resin is present in an amount of 10 to 50% by mass based on the total mass of the ink, the coloring agent is present in an amount of 1 to 30% by mass based on the total mass of the ink, the isocyanate compound is present in an amount of 1 to 30% by mass based on the total mass of the ink, and the solvent is present in an amount of 20 to 70% by mass based on the total mass of the ink.

7. The golf ball according to claim 1, wherein the golf ball body is a multi-piece golf ball body comprising:

a rubber core or a thread-wound core, and a cover made from a thermoplastic resin containing an ionomer as a major component.

8. The golf ball according to claim 1, wherein the golf ball body is a one piece golf ball body.

9. The golf ball according to claim 1, wherein the golf ball has a clear coat as an outermost layer.

10. A golf ball comprising a golf ball body, and a mark printed on the golf ball body with an ink, wherein:

the ink includes an epoxy resin having a hydroxyl value of 50 or more (mg KOH/g), a coloring agent, an isocyanate compound as a curing agent, and a solvent; and the golf ball body is a multi-piece golf ball body including, a rubber core or a thread-wound core, and a cover made from a thermoplastic resin containing an ionomer as a major component.

11. The golf ball according to claim 10, wherein:

the epoxy resin is present in an amount of 10 to 50% by mass based on the total mass of the ink, the coloring agent is present in an amount of 1 to 30% by mass based on the total mass of the ink, the isocyanate compound is present in an amount of 1 to 30% by mass based on the total mass of the ink, and the solvent is present in an amount of 20 to 70% by mass based on the total mass of the ink.

12. The golf ball according to claim 11, wherein the isocyanate compound is at least one member selected form the group consisting of hexamethylene diisocyanate, xylylene diisocyanate, hydrogenated xylylene diisocyanate, isphorone diisocyanate, tetramethylxylylene diisocyanate, hydrogenated diphenylmethane diisocyanate, and tolylene diisocyanate.

13. The golf ball according to claim 12, wherein the golf ball has a clear coat as an outermost layer.

* * * * *